United States Patent
Takahashi

(10) Patent No.: US 6,201,198 B1
(45) Date of Patent: Mar. 13, 2001

(54) ROTARY CONNECTOR

(75) Inventor: Seishi Takahashi, Miyagi-ken (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/302,638

(22) Filed: Apr. 30, 1999

(30) Foreign Application Priority Data

May 8, 1998 (JP) ................................................ 10-126120

(51) Int. Cl.$^7$ ............................ H01R 39/00; H01F 35/04
(52) U.S. Cl. .......................................... 200/61.54; 439/15
(58) Field of Search ........................ 200/4, 17 R, 61.27, 200/61.3, 61.35, 61.36, 61.54, 332, 335, 61.55, 61.56; 439/15, 164

(56) References Cited

U.S. PATENT DOCUMENTS

| | | | |
|---|---|---|---|
| 5,769,649 | * 6/1998 | Welschholz et al. ................. | 439/164 |
| 5,773,776 | * 6/1998 | Uleski et al. ....................... | 200/61.27 |
| 5,847,342 | * 12/1998 | Uchiyama et al. ................. | 200/61.54 |
| 5,917,163 | * 6/1999 | Lecznar et al. .................... | 200/61.54 |
| 5,936,215 | * 8/1999 | Masuda et al. ..................... | 200/61.3 |
| 6,008,457 | * 12/1999 | Klein et al. ........................ | 200/61.54 |
| 6,022,230 | * 2/2000 | Matsumoto ......................... | 439/164 |

FOREIGN PATENT DOCUMENTS

| | | | |
|---|---|---|---|
| 44 18 328 A1 | 11/1995 | (DE) ................................ | B60Q/1/42 |
| 44 22 305 C2 | 12/1995 | (DE) ............................... | B60R/16/02 |
| 771 693 A1 | 5/1997 | (EP) ............................... | B60R/16/02 |

OTHER PUBLICATIONS

Copy of Office Action from the German Patent Office, issued on September 12, 200 for German Patent Application No. 19920994, and English translation. 4.

* cited by examiner

*Primary Examiner*—Michael Friedhofer
(74) *Attorney, Agent, or Firm*—Brinks Hofer Gilson & Lione

(57) ABSTRACT

A rotary connector adapted to reliably operate a canceling mechanism for a winker, which is provided in a combination switch, and to reduce the distance between a steering wheel and the combination switch. Constituent components of the rotary connector are accommodated in a center hole provided in a casing of the combination switch. A canceling lever of the canceling mechanism protrudes into this center hole. The rotary connector broadly comprises a stator member supported on the casing, a rotor member rotating in response to rotation of a steering wheel, a slip-off preventing member, which is snap-connected to the rotor member, for preventing the rotor member from slipping off the stator member, and a flexible cable stored in an annular space defined between the stator member and the rotor member. A canceling lever is positioned in a turning region of the cancel cam provided on the upper portion of the rotor member.

4 Claims, 2 Drawing Sheets

ROTARY CONNECTOR

BACKGROUND OF THE INVENTION

1. Field of the Invention

The present invention generally relates to a rotary connector to be used as a means for electrically connecting electrical components, such as an airbag inflator mounted on a steering wheel, to a car-body-side circuit. More particularly, the present invention relates to a rotary connector supported by a combination switch whose stator member has a canceling mechanism for a winker.

2. Description of the Related Art

A rotary connector is incorporated into a steering device of a car and is used as an electrical connection means for electrically connecting a steering wheel to a steering column. In such a case, the rotary connector broadly employs a mounting structure in which a rotor member thereof is connected to the steering wheel and in which a stator member thereof is attached to a combination switch that is fitted to the steering column.

FIG. 3 is a sectional diagram showing a conventional rotary connector. This rotary connector 1 broadly comprises a stator member 2, a rotor member 3, a slip-off preventing member 4 for rotatably connecting the rotor member 3 to the stator member 2, and a flexible cable 5 accommodated in an annular space provided between the stator member 2 and the rotor member 3. The stator member 2 consists of a cylindrical outer peripheral wall 2a and a ring-like bottom plate 2b. The outer peripheral wall 2a and the bottom plate 2b are integrated into one piece by being screwed or thermally caulked. The rotor member 3 has a cylindrical inner peripheral wall 3a and a ceiling plate 3b. A driving pin 3c is provided on the top surface of the ceiling plate 3b in such a way as to project therefrom. The slip-off preventing member 4 has a cylindrical portion 4a and a flange portion 4b. A cancel cam 4c is formed outside the lower part of the cylindrical portion 4a. The cylindrical portion 4a of the slip-off preventing member 4 is inserted from below into the space surrounded by the inner peripheral surface wall 3a of the rotor member 3 fitted to the upper opening of the stator member 2. Then, the cylindrical portion 4a and the rotor member 3 are snap-connected to each other. Thus, the rotor member 3 and the slip-off preventing member 4 are rotatably connected to the stator member 2 in such a manner as to be integral with each other. The flexible cable 5 is constituted by a flat cable having a plurality of conductors carried by belt-like insulating tape. Both the ends of this flexible cable 5 are respectively fixed to the outer peripheral wall 2a of the stator member 2 and the inner peripheral wall 3a of the rotor member 3 and are electrically led to the exterior.

On the other hand, a center hole 8 is provided in a casing 7 constituting an outer shell of the combination switch 6. This casing 7 is mounted on a column cover (not shown) of the steering device. An operation lever 9 for performing a winker operation and a passing operation is rotatably supported on the combination switch 6. The combination switch 6 incorporates a locking mechanism for locking this operation lever 9 in an operating position and a canceling mechanism for a winker. The canceling mechanism is operative to automatically return the operation lever 9, which is in the operating position, to a center position. A leading edge of a canceling lever 10, which is a constituent component of the canceling mechanism for a winker, projects into the center hole 8. Incidentally, a wiper switch (not shown) is attached through the center hole 8 to a place being opposite to the operation lever 9.

The stator member 2 of the rotary connector 1 constructed as described above is fixed to the top surface of the casing 7 of the combination switch 6 by being screwed or snap-connected. At that time, the cylindrical portion 4a of the slip-off preventing member 4 projecting downwardly from the stator member 2 is inserted into the center hole 8 of the combination switch 6. A leading edge of the canceling lever 10 of the canceling mechanism for a winker is placed in a turning region of the cancel cam 4c, which is formed in the cylindrical portion 4a. Further, a driving pin 3c provided on the ceiling plate 3b of the rotor member 3 in a protruding manner is caught in a hub hole of the steering wheel 11. When the steering wheel 11 is rotated clockwise or anticlockwise, the rotor member 3 is rotated in the same direction by the rotating force of the wheel 11. Thus, the flexible cable 5 is wound or unwound in the annular space. At that time, the rotor member 3 and the slip-off preventing member 4 snap-connected thereto integrally rotate. The rotation of the slip-off preventing member 4 causes the cancel cam 4c and the canceling lever 10 of the canceling mechanism to operate. Consequently, in the case that a winker operation is performed by moving the operation lever 9 to a left-hand or right-hand position, as the steering wheel 11 is rotated and returned to a neutral position, the operation lever 9 is automatically returned to a center position.

Meanwhile, in the aforementioned conventional rotary connector, the cancel cam 4c is formed on the slip-off preventing member 4 snap-connected to the rotor member 3. It is usually necessary to provide some clearance in this snap-connected portion. This clearance causes backlash in the rotational direction (or in the radial direction) between the rotor member 3 and the slip-off preventing member 4 and also causes deviation in the rotational direction between the steering wheel 11 and the cancel cam 4c. Consequently, the conventional rotary connector has a drawback in that the canceling lever 10 does not operate accurately.

Moreover, because the cancel cam 4c is formed on the slip-off preventing member 4, the stator member 2 of the rotary connector 1 is fixed to the top surface of the casing 7 of the combination switch 6. It is thus necessary to provide a space, in which the rotary connector 1 is placed, between the steering wheel 11 and the combination switch 6. Consequently, the conventional rotary connector has another drawback in that the height dimension of the rotary connector 1 is seriously limited.

SUMMARY OF THE INVENTION

Accordingly, an object of the present invention is to provide a rotary connector that eliminates the drawbacks of the conventional one.

To achieve the foregoing object, according to the present invention, there is provided a rotary connector which has a cancel cam mounted on an upper portion of a rotor member that is rotatably caught in a stator member by a slip-off preventing member, and which makes this cancel cam face a canceling mechanism for a winker, in a combination switch. With such a configuration, the canceling mechanism for a winker is operated by the cancel cam provided on the upper portion of the rotor member to which the rotating force of the steering wheel is directly transmitted. Consequently, the canceling mechanism for a winker is accurately operated. Furthermore, the rotary connector is accommodated in the combination switch. Thus, the distance between the steering wheel and the combination switch is reduced. Consequently, the degree of flexibility in designing a rotary connector is enhanced.

According to the present invention, there is provided a rotary connector which comprises a stator member supported by a combination switch having a canceling mechanism for a winker, a rotor member adapted to rotate in response to a steering wheel, a slip-off preventing member for catching this rotor member in the aforesaid stator member such that the rotor member is rotatable, and a flexible cable accommodated in a space defined between the aforesaid stator member and the aforesaid rotor member. This cancel cam is made to face the aforesaid canceling mechanism in the aforesaid combination switch.

With such a configuration, the canceling mechanism for a winker is operated by the rotor member to which the rotating force of the steering wheel is directly transmitted. Thus, the canceling mechanism for a winker is accurately operated. Moreover, the rotary connector is stored in the combination switch. Thus, the distance between the steering wheel and the combination switch is reduced.

Furthermore, according to the present invention, at least an outer peripheral wall of the aforesaid stator member may be constituted by a casing of the aforesaid combination switch. With such a configuration, the rotary connector and the combination switch are united into one unit element. Additionally, the size in the radial direction of the unit element is decreased.

Other features, objects and advantages of the present invention will become apparent from the following description of a preferred embodiment with reference to the drawings in which like reference characters designate like or corresponding parts throughout several views.

DETAILED DESCRIPTION OF THE PREFERRED EMBODIMENT

Figure 1:
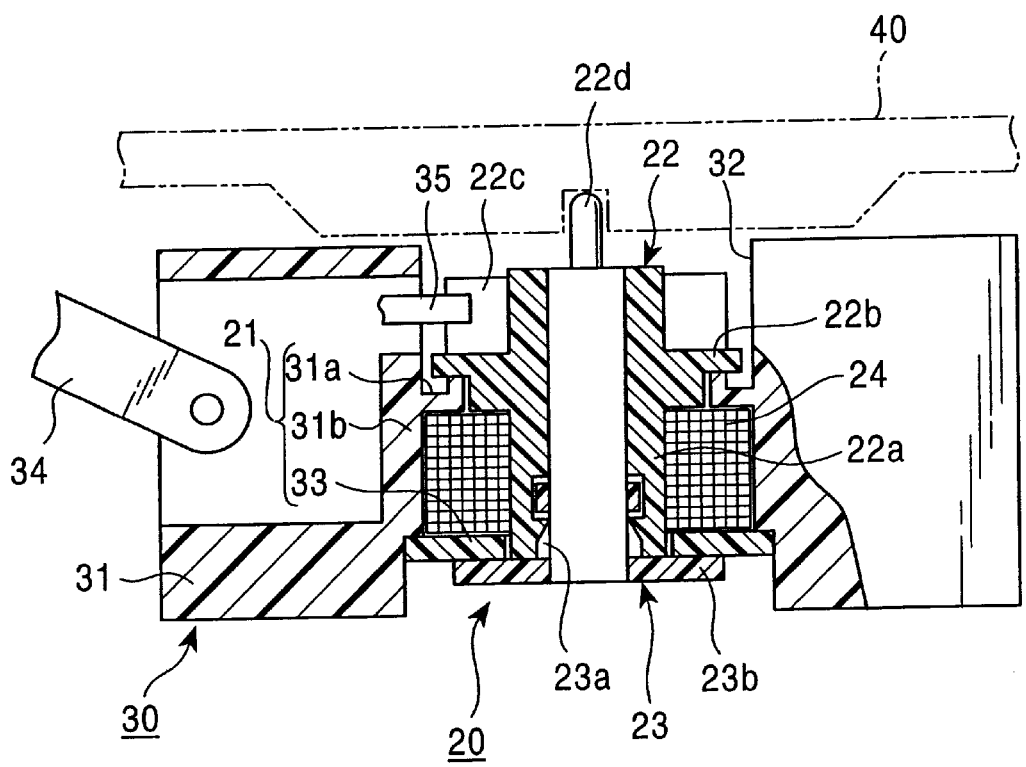
FIG. 1 is a sectional view of a rotary connector embodying the present invention.
Figure 2:
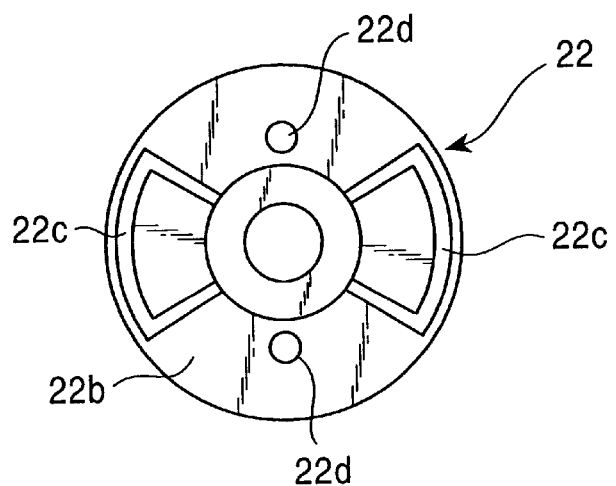
FIG. 2 is a plan view of a rotor member to be provided in the rotary connector shown in,FIG. 1.
Figure 3:
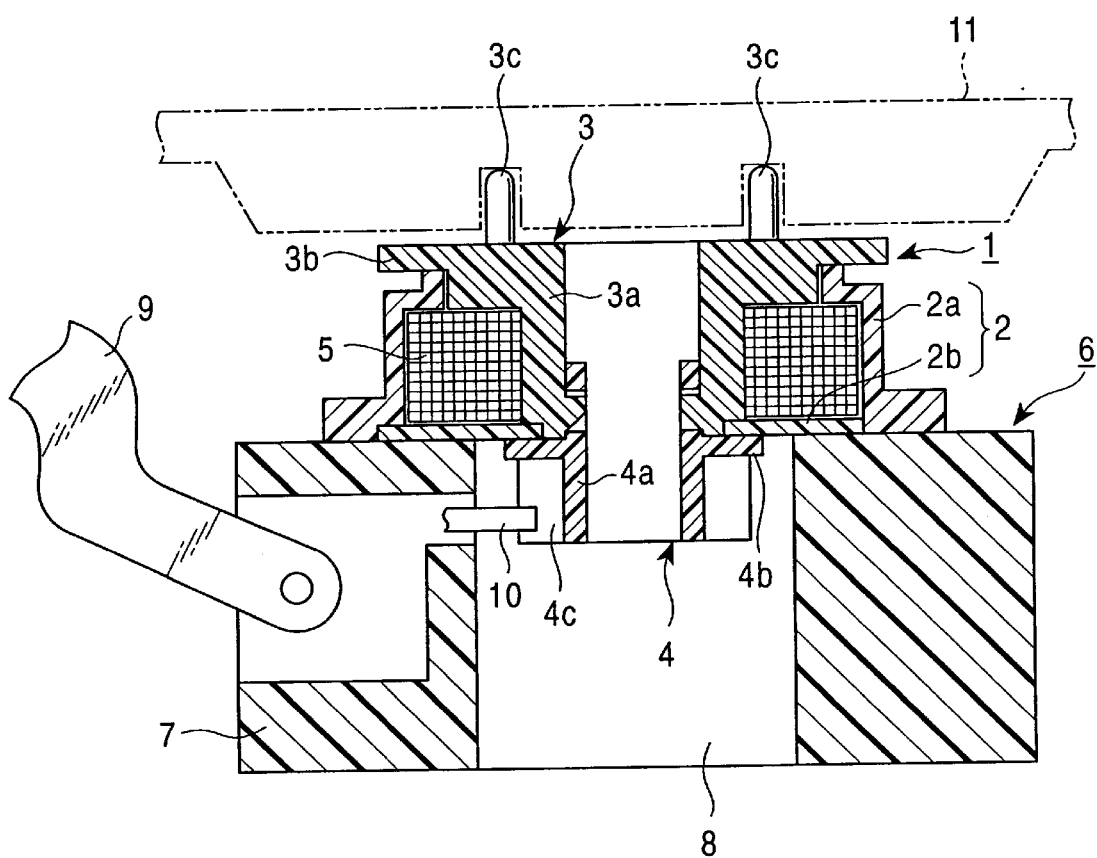
FIG. 3 is a sectional view of the conventional rotary connector.

Hereinafter, the preferred embodiment of the present invention will be described in detail by referring to the accompanying drawings. FIG. 1 is a sectional view of a rotary connector embodying the present invention. FIG. 2 is a plan view of a rotor member to be provided in the rotary connector shown in FIG. 1.

The rotary connector embodying the present invention is united to a combination switch 30. A center hole 32 is provided in a casing 31 of this combination switch 30. The casing 31 is formed by using a synthetic resin. A flange portion 31a projecting to the center of the center hole 32 is formed in such a way as to be integral with the casing 31. A ring-like bottom plate 33 is fixed to the bottom end of a cylindrical portion 31b downwardly continuing from the outer peripheral edge of this flange portion 31a by screwing or thermally caulking. The stator member (to be described later) of the rotary connector 20 is constituted by this bottom plate 33, and the flange portion 31a and the cylindrical portion 31b of the casing 31. Furthermore, an operation lever 34 for performing a winker operation and a passing operation is rotatably supported on the casing 31. The casing 31 incorporates a locking mechanism for locking this operation lever 34 in an operating position and a canceling mechanism for a winker. The canceling mechanism is operative to automatically return the operation lever 34, which is in the operating position, to a center position. A leading edge of a canceling lever 35, which is a constituent component of the canceling mechanism for a winker, projects into an upper part of the center hole 32. Incidentally, a wiper switch (not shown) is attached through the center hole 32 to a place being opposite to the operation lever 34.

The rotary connector 20 broadly comprises a stator member 21, a rotor member 22, a slip-off preventing member 23 for rotatably connecting the rotor member 22 to the stator member 21, and a flexible cable 24 accommodated in an annular space provided between the stator member 21 and the rotor member 22. As described above, in the case of this embodiment, the stator member 21 consists of the flange portion 31a and the cylindrical portion 31b of the combination switch 30, and the bottom plate 33. The rotor member 22 has a cylindrical inner peripheral wall 22a and a ceiling plate 22b. The rotor member 22 rotates by using the inner edge portions of the flange portion 31a and the bottom plate 22 as a guide portion of the stator member 21. The slip-off preventing member 23 has a cylindrical portion 23a and a flange portion 23b. This cylindrical portion 23a is inserted into the inner peripheral wall 22a of the rotor member 22 and is then snap-connected thereto. The rotor member 22 and the slip-off preventing member 23 united as one piece are rotatably connected to the stator member 21. The flexible cable 24 is constituted by a flat cable having a plurality of conductors carried by belt-like insulating tape. Both the ends of this flexible cable 24 are respectively fixed to the cylindrical portion 31b of the stator member 21 and the inner peripheral wall 22a of the rotor member 22 and are electrically led to the exterior. As shown in FIG. 2, a pair of cancel cams 22c are respectively formed on the ceiling plate 22b at opposite positions that are at an angular distance of 180 degrees. A driving pin 22d is provided between the cancel cams 22c in such a way as to project therefrom. The cancel cam 22c rotates in the center hole 32 provided in the combination switch 30. A leading edge of the canceling lever 35 of the canceling mechanism for a winker is placed in a turning region of the cancel cam 22c. Further, the driving pin 22d projects from the top end of the center hole and is caught in a hub hole of the steering wheel 40.

When the steering wheel 40 is rotated clockwise or anticlockwise during the connector is used, the rotating force of the wheel 40 is transmitted to the rotor member 22 of the rotary connector 20 through the driving pin 22d. Thus, the rotor member 22 and the slip-off preventing member 23 snap-connected to each other are rotated in the same direction. The flexible cable 24 is wound or unwound in the annular space. The rotation of the rotor member 22 causes the cancel cam 22c to drive the canceling lever 35 of the canceling mechanism for a winker. The cancel cam 22c is formed on the rotor member 22 to which the rotating force of the steering wheel 40 is directly transmitted. Thus, there is no difference in the rotational direction between the steering wheel 40 and the cancel cam 22c. Consequently, the canceling lever 35 is accurately operated. Therefore, in the case that a winker operation is performed by moving the operation lever 34 to a left-hand or right-hand position, as the steering wheel 40 is rotated and returned to a neutral position, the operation lever 34 is automatically returned to a center position.

Thus, in the aforementioned embodiment, the cancel cam 22c is provided at the upper portion of the rotor member 22 to which the rotating force of the steering wheel 40 is directly transmitted. This cancel cam 22c is made to face the canceling lever 35 of the canceling mechanism for a winker, in the center hole 32 of the combination switch 30. Therefore, there is no deviation in the rotational direction between the steering wheel 40 and the cancel cam 22c. Consequently, the canceling lever 35 is accurately operated. Further, the constituent components of the rotary connector 20 are stored in the center hole 32 of the combination switch 30. Thus, the distance between the steering wheel 40 and the combination switch 30 is reduced. Consequently, the degree of flexibility in designing a rotary connector is enhanced. Moreover, the casing 31 of the combination switch 30 is also used as the stator member 21 of the rotary connector 20. Thus, the rotary connector 20 and the combination switch 30 are united into one unit element. Furthermore, the size in the radial direction of the unit element is decreased.

Incidentally, the foregoing description has described the case that the stator member of the rotary connector is constituted by the casing of the combination switch. The rotary connector of the present invention, however, may singly be first assembled, similarly as the conventional rotary connector, and may be provided afterward in the center hole of the combination switch.

The present invention is implemented by the aforementioned embodiment and has the following advantageous effects.

The aforementioned embodiment has a cancel cam provided on the upper portion of the rotor member that is rotatably caught in the stator member by the slip-off preventing member. Moreover, in the combination switch, this cancel cam is made to face the canceling mechanism for a winker. Thus, the canceling mechanism for a winker is operated by the cancel cam provided on the upper portion of the rotor member to which the rotating force of the steering wheel is directly transmitted. Consequently, the canceling mechanism for a winker is accurately operated. Furthermore, the rotary connector is accommodated in the combination switch. Thus, the distance between the steering wheel and the combination switch is reduced. Consequently, the degree of flexibility in designing a rotary connector is enhanced.

Although the preferred embodiment of the present invention has been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A combination switch having a canceling mechanism for a winker to be used in conjunction with a rotary connector, the combination switch comprising:

(a) a casing, the casing having a center hole formed therethrough;

(b) a canceling lever, the canceling lever having a leading end, the leading end extending from the casing of the combination switch to the center hole of the casing of the combination switch, the canceling lever being rotatably movable towards or away from the center hole of the casing of the combination switch;

(c) a cylindrical stator member, the cylindrical stator member having a central hole formed therethrough, the central hole of the cylindrical stator member forming the center hole of the casing of the combination switch, the stator member comprising:

(i) a cylindrical wall, the cylindrical wall forming a casing portion around the center hole of the casing of the combination switch, (ii) a ring-like bottom plate, the ring-like bottom plate having a central hole formed therethrough, the ring-like bottom plate extending from the lower part of the cylindrical wall toward the center of the center hole of the casing of the combination switch, and (iii) a ring-like flange, the ring-like flange positioned at an upper portion of the bottom plate;

(d) a cylindrical rotor member, the cylindrical rotor member adapted to rotate in response to rotation of a steering wheel, the rotor member comprising:

(i) an outer peripheral part, and (ii) a flange, the flange disposed at the upper portion of the outer peripheral part, the flange of the rotor supported while the flange of the stator member is abutted from below and the lower end of the stator member is fitted in the central hole of the ring-like bottom plate of the stator member, the flange having a canceling cam disposed thereon, the canceling cam operating the canceling lever as the flange rotates;

(e) a slip-off preventing member, the slip-off preventing member for rotatably supporting the rotor member against the stator member, the slip-off preventing member comprising:

(i) a flange, the flange above the ring-like bottom plate of the stator member, the flange abutting the ring-like bottom plate of the stator member, and (ii) an engaging part, the engaging part snap-fitted into the stator member; and (f) a flexible cable, the flexible cable accommodated in a space formed between the stator member and the rotor member.

2. The combination switch according to claim 1, further comprising a second canceling cam, the two canceling cams disposed symmetrically on opposite sides of the flange of the rotor member.

3. The combination switch according to claim 2, further comprising a driving pin, the driving pin disposed on the flange of the rotor member between the canceling cams such that the driving pin projects generally perpendicularly to the surface of the flange, wherein the driving pin is adapted to be connected to a steering wheel for rotationally driving the rotor member.

4. The combination switch according to claim 1, wherein the cancel cam is shaped in the form of a block that progressively widens from the center of the flange toward the outer edge of the flange.

* * * * *

UNITED STATES PATENT AND TRADEMARK OFFICE
CERTIFICATE OF CORRECTION

PATENT NO. : 6,201,198 B1
DATED : March 13, 2001
INVENTOR(S) : Seishi Takahashi

It is certified that error appears in the above-identified patent and that said Letters Patent is hereby corrected as shown below:

<u>Title page,</u>
Item [73], insert -- Tokyo -- before "(JP)".

OTHER PUBLICATIONS, delete "200" and substitute -- 2000 -- in its place.

<u>Claim 1,</u>
Line 10, delete "towards" and substitute -- toward -- in its place.

Signed and Sealed this

Sixteenth Day of April, 2002

Attest:

JAMES E. ROGAN
*Director of the United States Patent and Trademark Office*

*Attesting Officer*